US011825784B1

(12) United States Patent
Sankaranarayanan

(10) Patent No.: US 11,825,784 B1
(45) Date of Patent: Nov. 28, 2023

(54) ARTIFICIAL INTELLIGENCE ENABLED IOT-FOG SYSTEM IN HYDROPONIC AUTOMATION FOR HETEROGENEOUS PLANTS

(71) Applicant: KING FAISAL UNIVERSITY, Al-Ahsa (SA)

(72) Inventor: Suresh Sankaranarayanan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/211,216

(22) Filed: Jun. 16, 2023

(51) Int. Cl.
   *A01G 31/02* (2006.01)
   *G06T 7/00* (2017.01)

(52) U.S. Cl.
   CPC ............ *A01G 31/02* (2013.01); *G06T 7/0012* (2013.01); *G06T 2207/20081* (2013.01); *G06T 2207/30188* (2013.01)

(58) Field of Classification Search
   CPC .................. A01G 31/02; G06T 7/0012; G06T 2207/20081; G06T 2207/30188
   See application file for complete search history.

(56) References Cited

U.S. PATENT DOCUMENTS

| 10,219,447 | B1 * | 3/2019 | DeCarli | B65D 88/005 |
| 10,813,295 | B2 * | 10/2020 | Alexander | G01N 33/0098 |
| 11,337,381 | B1 * | 5/2022 | Nelson | G06Q 50/02 |
| 2018/0014486 | A1 * | 1/2018 | Creechley | A01G 9/249 |
| 2020/0184153 | A1 * | 6/2020 | Bongartz | A01G 9/24 |
| 2021/0027057 | A1 | 1/2021 | Genty et al. | |
| 2023/0200319 | A1 * | 6/2023 | Almadani | G16Y 20/10 47/62 R |

FOREIGN PATENT DOCUMENTS

| IN | 202041053190 A | 12/2020 |
| IN | 202241001146 A | 12/2020 |

(Continued)

OTHER PUBLICATIONS

Lakshmanan et al., "Automated smart hydroponics system using internet of things", International Journal of Electrical and Computer Engineering (IJECE), vol. 10, No. 6, Dec. 2020, pp. 6389-6398 (Year: 2020).*

(Continued)

*Primary Examiner* — Nay A Maung
*Assistant Examiner* — Jose M Torres
(74) *Attorney, Agent, or Firm* — Nath, Goldberg & Meyer; Richard C. Litman

(57) ABSTRACT

A hydroponic system is managed by obtaining hydroponic data using a plurality of sensors in a hydroponic cultivator. Data from the plurality of sensors is communicated to a data aggregator, which renders the sensed data from the plurality of sensors in a predetermined data format, as aggregator output data. The aggregator output data is communicated to a fog computing unit, which, in turn, communicates with outside computing routed over the Internet backbone or "cloud". The fog computing unit is used to control operation of the hydroponic cultivator based on direct control commands executed through the fog control unit and data inputs obtained by communications with outside computing routed over the Internet backbone or "cloud".

17 Claims, 1 Drawing Sheet

(56) References Cited

FOREIGN PATENT DOCUMENTS

| IN | 202011033907 A | 8/2022 |
| IN | 202221026711 A | 8/2022 |

OTHER PUBLICATIONS

Mehra et al., "IoT based hydroponics system using Deep Neural Networks", Computers and Electronics in Agriculture 155 (2018), pp. 473-486 (Year: 2018).*

Mendez-Guzman et al., "IoT-Based Monitoring System Applied to Aeroponics Greenhouse", Sensors 2022, 22, 5646, pp. 1-18 (Year: 2022).*

Vincentdo, V. et al., "Nutrient Film Technique-Based Hydroponic Monitoring and Controlling System Using ANFIS" Electronics 12:1446, Mar. 2023.

Sharma, V. & Srivastav, V.K., "IOT & artificial intelligence based automated smart hydroponics system" International Journal of Science Technology and Management 12(3): pp. 14-19, Mar. 2023.

Rayhana, Rakiba, "Internet of Things Empowered Smart Greenhouse Farming", IEEE Journal of Radio Frequency Identification, vol. 4, No. 3, Sep. 2020.

Mohamad Khairul Hafizi Rahimi, et al., "A Secure Cloud Enabled Indoor Hydroponic System Via ThingsSentral IoT Platform", IEEE 8th Conference on Systems, Process and Control (ICSPC), Dec. 2020.

Falmata Modu, et al., "A Survey of Smart Hydroponic Systems", Advances in Science, Technology and Engineering Systems Journal, vol. 5, No. 1, pp. 233-248, 2020.

Manoj D. Tambakhe, et al., "A Survey on Techniques and Technology Used in Hydroponics System", EasyChair Preprint, No. 3628.

Muhamad Asmi Romli, et al., "Aquaponic Growbed Water Level Control Using Fog Architecture", 1st International Conference on Big Data and Cloud Computing (ICoBiC) IOP Conf. Series: Journal of Physics: Conf., Series 1018, 2018.

* cited by examiner

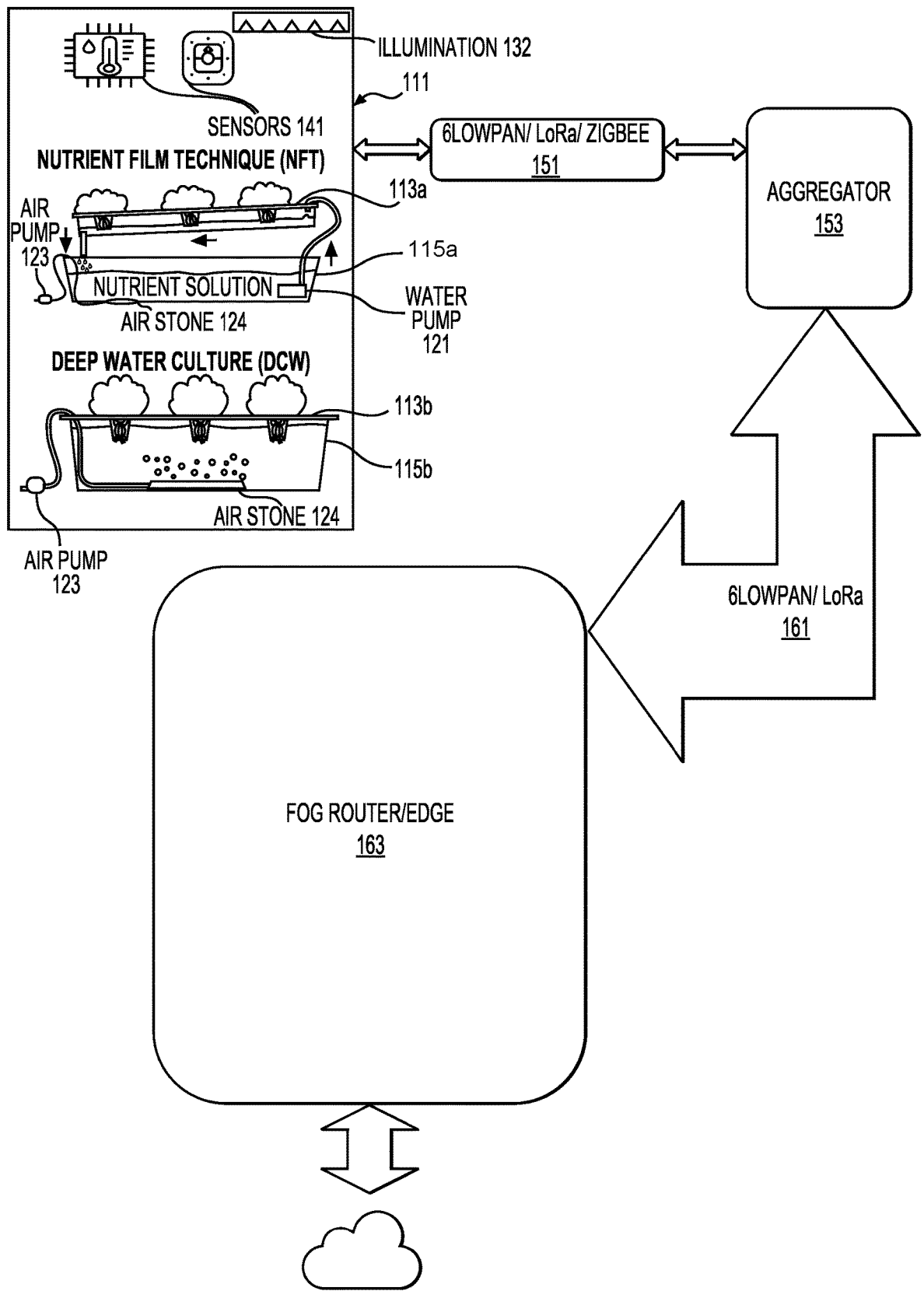

ARTIFICIAL INTELLIGENCE ENABLED IOT-FOG SYSTEM IN HYDROPONIC AUTOMATION FOR HETEROGENEOUS PLANTS

BACKGROUND

Technical Field

The present disclosure relates to an artificial intelligence enabled IoT-fog system in hydroponic automation for heterogeneous plants.

Background Art

Vertical farming or hydroponics technology provides a great solution to grow plants or crops with greater productivity in desert lands where fertile soil with nutrients, proper sunlight, well-maintained temperature, humidity, quality of water, and related qualities, are issues for growing crops using traditional methods. Hydroponics also reduces farmers' dependency on ambient environmental conditions for growing crops and also on the amount of soil a farmer is holding as, within a small piece of land, good yield can be obtained using vertical farming.

As indicated, the challenges of growing crops using traditional methods in desert land include fertile soil with nutrients, proper sunlight, well-maintained temperature and humidity, quality of water, etc. A solution to these challenges is vertical farming, such as hydroponics technology. Such hydroponic cultivators traditionally are configured for monoculture hydroponic agriculture, which facilitates a fixed regimen of operation. If polyculture or polycropping is implemented, the configuration for such things as moisture, oxygenation and lighting may vary. Additionally, as is well-known in the art of *cannabis* greenhouse agriculture, different stages of plant growth benefit from different conditions, even extending to differences in optimum light color temperature at different growth stages. Accordingly, there is a need in the art for vertical farming systems solving these problems.

SUMMARY

Management of a hydroponic system is provided by obtaining hydroponic data using a plurality of sensors, including sensors in a hydroponic cultivator. Data from the sensors is communicated to a data aggregator. The data aggregator renders the sensed data in a predetermined data format, as aggregator output data. The aggregator output data is communicated to a fog computing unit, which, in turn, communicates with outside computing routed over the Internet backbone or "cloud". The fog computing unit is used to control operation of the hydroponic cultivator based on direct control commands executed through the fog control unit and data inputs obtained by communications with outside computing routed over the Internet backbone or "cloud".

In an embodiment, the present subject matter relates to a method for management of a hydroponic system, the method comprising: providing a plurality of sensors in a hydroponic cultivator; communicating data from the plurality of sensors to a data aggregator; rendering sensed data from the plurality of sensors in a predetermined data format in the data aggregator as aggregator output data; communicating the aggregator output data to a fog computing unit; using the fog computing unit to communicate with outside computing routed over an Internet backbone or "cloud"; and using the fog computing unit to control operation of the hydroponic cultivator based on direct control commands executed through the fog computing unit and data inputs obtained by communications with the outside computing routed over the Internet backbone or "cloud".

In another embodiment, the present subject matter relates to a hydroponic system, the hydroponic system comprising: a plurality of sensors in a hydroponic cultivator; a data communication link configured for communicating data from the plurality of sensors to a data aggregator; the data aggregator configured for rendering sensed data from the plurality of sensors in a predetermined data format as aggregator output data; a communication link configured for communicating the aggregator output data to a fog computing unit; an external communication link configured for allowing the fog computing unit to communicate with outside computing routed over an Internet backbone or "cloud"; and instructions stored in non volatile media for instructing the fog computing unit to control operation of the hydroponic cultivator based on direct control commands executed through the fog computing unit and data inputs obtained by communications with the outside computing routed over the Internet backbone or "cloud".

In a further embodiment, the present subject matter relates to a hydroponic system, the hydroponic system comprising: means for providing a plurality of sensors in a hydroponic cultivator; a data aggregator and a fog computing unit; means for communicating data from the plurality of sensors to the data aggregator; means for rendering sensed data from the plurality of sensors in a predetermined data format in the data aggregator as aggregator output data; means for communicating the aggregator output data to the fog computing unit; and means for using the fog computing unit to communicate with outside computing routed over an Internet backbone or "cloud", wherein the fog computing unit is configured for controlling operation of the hydroponic cultivator based on direct control commands executed through the fog computing unit and data inputs obtained by communications with the outside computing routed over the Internet backbone or "cloud".

BRIEF DESCRIPTION OF THE DRAWINGS

The drawing FIGURE is a schematic block diagram of the disclosed technique.

DETAILED DESCRIPTION

The present disclosure deals with automation of a Nutrient Film Technique (NFT) and a Deep Water Culture (DWC) Hydroponics technique towards heterogeneous smaller and large root plant growth using Internet of Things (IoT), Artificial Intelligence (AI) and machine learning for large scale indoor agriculture. The parameters for plant growth in a hydroponic technique are collected from sensors and analyzed using an Artificial Intelligence (AI) model. After analyzing input parameters from the sensors, the AI-based model is responsible for providing and maintaining optimum nutrient quality based on parameters including, but not limited to, pH, salinity, Total Dissolved Solids (TDS) and Electrical Conductivity (EC), in a nutrient tank, artificial lighting for photosynthesis, and temperature and humidity for the heterogeneous plant growth using the NFT and/or DWC techniques. Analysis based on sensed data is performed by an AI model at different stages throughout the lifecycle of the various crops to analyze the requirements of the crops at particular stages and, accordingly, various nutrients, light, temperature, and humidity are provided by the AI model to implement sustainable and healthy growth. It is desired to further improve the utility of hydroponic system management by applying machine learning algorithms to the process.

The present disclosure is focused on the automation of NFT and/or DWT hydroponics techniques towards heterogeneous smaller and large root plant growth using IoT and AI for large scale indoor agriculture to address the various issues resulting from the challenges of growing plants in a desert climate. The parameters for heterogeneous plant growth in hydroponic techniques are collected from sensors and analyzed by deploying the optimized artificial intelligence model at the edge/fog, which is resource constrained. The AI based model is optimized at the edge/fog and responsible for providing and maintaining optimum nutrient quality based on parameters including, but not limited to, pH, salinity, Total Dissolved Solids (TDS) and Electrical Conductivity (EC), in a nutrient tank, artificial lighting for photosynthesis, and temperature and humidity for the heterogeneous plant growth in NFT and/or DWC techniques. In addition, artificial intelligence optimized at the edge/fog for visual prediction of different stages of heterogeneous plant growth at appropriate time periods in both NFT and DWC for sustainable and proper growth in producing health food products. This provides a completely automated system driven by AI integrated with IoT sensor and edge/fog computing without human intervention. This system and process allows for controlling the large hydroponic environment for the growth of different small and large root plants using NFT and DWT technique on large scale by providing optimum quality of nutrients, light, temperature and humidity with image analysis towards sustainable and healthy growth.

An artificial intelligence enabled IoT-fog system in hydroponic automation for heterogeneous crops is provided. As a non-limiting example, the system is useful vertical farming or hydroponics technology for growing crops with greater productivity in desert land. In such environments, the disclosed system also reduces farmer's dependency on ambient environmental conditions for growing crops and also on the amount of soil the farmer occupies, as a small piece of land can provide a good yield by using vertical farming cultivation techniques.

The advantages of the disclosed system is that individual sensors can be used to gather information, but the determination of the overall operation can be based on inputs received throughout the system. Additionally by the use of AI, it is possible to have adjustments or conditions sensed by individual sensors propagate throughout the system, but without the need to engage in directly programming the system during operation in order to determine the optimum response to the conditions sensed by the individual sensors.

The present disclosure focuses on using AI in fog computing, implemented for hydroponic plant growth. The disclosed techniques optimize hydroponic growth in NFT and DWC for different plants, thereby allowing heterogenous plants to be grown at the same time. The Fog computing unit is deployed with an optimized AI model for analyzing and controlling the heterogeneous plants growth in both NFT and DWC for sustainable growth. In addition, the image analysis can be implemented as a deep learning model optimized at the fog computing device for heterogeneous plant growth from seedling stages to full grown stages which varies from plant to plant for sustainable growth and action.

The fog computing unit can function by using optimization to control operation of the hydroponic cultivation of heterogeneous plants, including, by way of non-limiting example, cultivation in both NFT and DWC techniques. The optimized AI model can be executed through the fog computing unit and data inputs obtained by communications with the outside computing routed over the Internet backbone or "cloud" (remote internet computing and storage, which often have functions distributed over multiple locations). In addition, the image analysis of a deep learning model optimized at the fog computing device can provide for heterogeneous plant growth from seedling stages to full grown stages which varies from plant to plant and at different stages of plant growth for sustainable growth and action.

In addition, the image analysis to implement a deep learning model can be optimized at the fog computing device for heterogeneous plant growth from seedling stages to full grown stages which varies from plant to plant for sustainable growth and action. Operation of AI is based on a machine learning model being implemented inside the fog computing in an optimized manner towards optimized usage of resource for efficient output towards controlling the hydroponic parameters. The AI can optimize the usage in Fog computing towards memory, computation time, and energy, resulting in controlling the hydroponic environment for various stages of plant growth. The optimization can include image analysis of the various stages of plant growth for their sustainable growth. The use of optimization for the various stages of plant growth implements a deep learning model.

The drawing FIGURE is a schematic block diagram of the disclosed technique. Depicted is hydroponic cultivator 111, which includes grow tray 113a or 113b, reservoir 115a or 115b and auxiliary equipment, including water pump 121, air pump 123 with air stone 124, and a light source such as artificial lighting 132 or sunlight. The hydroponic cultivator uses a nutrient solution in water, which is held in reservoir 115a or 115b and delivered to grow tray 113a or 113b. Sensors 141 are deployed inside hydroponic cultivator 111, and, by way of non-limiting examples, include hydroponic tank sensors, grow tray sensors, humidity sensors, temperature sensors and sunlight or illumination sensors. Other types of sensors may be deployed as needed. At least a subset of the sensors 141 are deployed inside the hydroponic cultivator.

Such hydroponic cultivators 111 traditionally are configured for monoculture hydroponic agriculture, which facilitates a fixed regimen of operation. If polyculture or polycropping is implemented, the configuration for such things as moisture, oxygenation and lighting may vary. Additionally, as is well-known in the art of *cannabis* greenhouse agriculture, different stages of plant growth benefit from different conditions, even extending to differences in optimum light color and temperature at different growth stages. Variations to hydroponic cultivation are also possible, including, as a non-limiting example, the Nutrient Film Technique (NFT), in which grow tray 113a is separate from reservoir 115a and water with nutrients in solution is pumped by water pump 121 to grow tray 113a.

In another non-limiting example, Deep Water Culture (DWC) is used, in which grow tray 113b is positioned so that the plant roots extend directly into reservoir 115b. The DWC configuration positions grow tray 113b so that plant roots extend into reservoir 115b, thereby reducing the requirements for pumping water.

Water delivery to the plants in grow tray 113a or 113b can range from direct immersion of grow tray 113b into reservoir 115b to an arrangement in which moisture migrates to grow tray 113a or the plant roots to drip irrigation using water pump 121. The use of drip irrigation is perhaps the most common hydroponic technique for systems in which grow tray 113a is separate from reservoir 115a. Likewise, the use of air pump 123 and air stone 124 is not necessary in all hydroponic systems, particularly if oxygen dissolved in the water is not required for plant growth.

While grow trays 113a, 113b for both NFT (grow tray 113a) and DWC (grow tray 113b) are shown in hydroponic cultivator 111, it is possible to implement the disclosed techniques using a single type of hydroponic technique (by way of non-limiting example, either NFT or DWC), by means of a different type of hydroponic technique other than NFT and DWC, or by a combination of these hydroponic techniques. Significantly, the disclosed technique can be used with such multiple types of hydroponic techniques.

Some of the sensors 141 provide information regarding the need to adjust the sensed conditions, so, for example, a moisture sensor can provide information regarding control of irrigation.

Information from sensors 141 is communicated by cultivator communication link 151 to data aggregator 153. Communication link 151 can be implemented by any suitable communication protocol, such as, in non-limiting examples, Ethernet, 6 Lowpan, LoRa, Zigbee, various WiFi and IEEE 802.11 family of standards protocols, and Bluetooth. (Ethernet, 6 Lowpan, LoRa, Zigbee, WiFi and IEEE 802.11 and Bluetooth are trademarks of their respective sanctioning or standards organisations.) Aggregator 153 provides sensor data aggregation of different plants in hydroponic cultivator 111. Aggregator 153 renders the sensed data received through communication link 151 in a predetermined data format in the data aggregator as a aggregator output data. In a non-limiting example, aggregator 153 stores the aggregator output data in a data store; however, it is alternatively possible to use aggregator 153 to relay the aggregator output data in real time without storing the aggregator output data in a data store. Aggregator 153 outputs the aggregator output data to aggregated data link 161, which transmits the aggregated data to fog computing unit 163. Aggregated data link 161 can be implemented by any suitable communication protocol.

In a particular, non-limiting embodiment of the present disclosure, the hydroponic system includes a plurality of sensors in a hydroponic cultivator, a data communication link configured for communicating data from the plurality of sensors to a data aggregator configured for rendering sensed data from the plurality of sensors in a predetermined data format as aggregator output data, a communication link configured for communicating the aggregator output data to a fog computing unit, an external communication link configured for allowing the fog computing unit to communicate with outside computing routed over an Internet backbone or "cloud", and instructions stored in non volatile media for instructing the fog computing unit to control operation of the hydroponic cultivator based on direct control commands executed through the fog computing unit and data inputs obtained by communications with the outside computing routed over the Internet backbone or "cloud".

Within this embodiment, the fog computing unit is configured for providing data processing for data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data; is configured for filtering the data pertaining to nutrient quality, temperature, humidity, and light intensity, with redundancy removed; and is configured for routing the data pertaining to nutrient quality, temperature, humidity, and light intensity over the Internet backbone or "cloud".

The present techniques and disclosure also contemplates a system including sufficient software and hardware to support means for providing a plurality of sensors in a hydroponic cultivator, a data aggregator and a fog computing unit, means for communicating data from the plurality of sensors to the data aggregator, means for rendering sensed data from the plurality of sensors in a predetermined data format in the data aggregator as aggregator output data, means for communicating the aggregator output data to the fog computing unit, and means for using the fog computing unit to communicate with outside computing routed over an Internet backbone or "cloud", wherein the fog computing unit is configured for controlling operation of the hydroponic cultivator based on direct control commands executed through the fog computing unit and data inputs obtained by communications with the outside computing routed over the Internet backbone or "cloud".

Fog computing or fog networking takes advantage of edge computing and uses an architecture that uses edge devices to carry out a substantial amount of computation, storage, and communication locally and routed over the Internet backbone or "cloud". An edge device is a device that provides an entry point into enterprise or service provider core networks. Non-limiting examples include routers, routing switches, integrated access devices (IADs), multiplexers, and a variety of network access devices. Edge devices are types of router that provide authenticated access to faster, more efficient backbone and core networks. Advantageously, fog computing unit 163 is able to function autonomously, which allows the system to operate without reliable communications with outside computing routed over the Internet backbone or "cloud". Machine learning is used to adjust or add criteria in at least one of the analysis components.

By way of non-limiting example, fog computing unit 163 provides data processing for data pertaining to, among other things, nutrient quality, temperature, humidity, and light intensity of the hydroponic architecture. The nutrient quality can, by way of non-limiting example, include standard nutrient measurement values, such as pH, salinity, Total Dissolved Solids (TDS) and Electrical Conductivity (EC). Fog computing unit 163 can provide this data as integrated over time. The data collected are filtered, with redundancy removed, and routed over the Internet backbone or "cloud".

The data sent over the cloud, in addition to providing further evaluation of the environment in hydroponic cultivator 111, is used to validate deep reinforcement learning models for providing appropriate control action. This provides a model that is validated and optimized externally over the Internet backbone or "cloud" or at fog computing unit 163. This provides optimal control of nutrient in the nutrient solution, modulating light intensity and automating the humidity and temperature of the hydroponic environment in the hydroponic cultivator 111. This provides efficient growth, including efficient growth in the NFT and DWC techniques.

The disclosed technique uses a computer analysis, which is enhanced by machine learning. Specifically machine learning analysis is defined by any method, commercial or otherwise, which uses machine learning algorithms and/or artificial intelligence (AI) to generate some if not all of the control parameters for the hydroponics. By developing a library of criteria for hydroponic operation for different plant types, a machine learning model, or series of models can be developed where algorithms are tasked with analyzing and determining differences between classifications and criteria used in the hydroponic operation. The model and system described may be combined with other methods to enhance overall performance, such as limitations for individual crops or plant types. The methods detailed here fall under the category of supervised machine learning, in which model constraints (i.e., classifiers) are used to guide the learning process. The analysis can be performed by discrete analysis and by machine learning. In doing so, a sample input is input to a computer, either directly or by adjustments based on observed results.

In a particular, non-limiting embodiment, the disclosed technique is directed to a method for management of a hydroponic system. The method includes the steps of: providing a plurality of sensors in a hydroponic cultivator; communicating data from the plurality of sensors to a data aggregator; rendering sensed data from the plurality of sensors in a predetermined data format in the data aggregator as aggregator output data; communicating the aggregator output data to a fog computing unit; using the fog computing unit to communicate with outside computing routed over an Internet backbone or "cloud"; and using the fog computing unit to control operation of the hydroponic cultivator based on direct control commands executed through the fog computing unit and data inputs obtained by communications with the outside computing routed over the Internet backbone or "cloud". It is contemplated that the rendering the sensed data as aggregator output data includes rendering the sensed data from the plurality of sensors as an aggregation of data concerning different plants in the hydroponic cultivator and/or rendering the sensed data from the plurality of sensors as image data obtained from different plants in the hydroponic cultivator.

In a further, non-limiting embodiment, the method of the disclosed technique includes obtaining data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data, and using the fog computing unit to provide data processing for data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data, using the fog computing unit to filter the data pertaining to nutrient quality, temperature, humidity, and light intensity, with redundancy removed, and routing the data pertaining to nutrient quality, temperature, humidity, and light intensity from the fog computing unit over the Internet backbone or "cloud".

By controlling hydroponics using fog computing unit 163 and extending this by routing the data over the Internet backbone or "cloud", multiple variables resulting from hydroponic polyculture can be accommodated while providing for optimum growth.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for management of a hydroponic system, the method comprising:
   providing a plurality of sensors in a hydroponic cultivator;
   communicating data from the plurality of sensors to a data aggregator;
   rendering sensed data from the plurality of sensors in a predetermined data format in the data aggregator as aggregator output data;
   communicating the aggregator output data to a fog computing unit;
   using the fog computing unit to communicate with outside computing routed over an Internet backbone or "cloud"; and
   using the fog computing unit to control operation of the hydroponic cultivator based on direct control commands executed through the fog computing unit and data inputs obtained by communications with the outside computing routed over the Internet backbone or "cloud",
   wherein the rendering the sensed data as aggregator output data comprises rendering the sensed data from the plurality of sensors as an aggregation of data concerning different plants in the hydroponic cultivator.

2. The method as described in claim 1, further comprising:
   the fog computing unit using optimization to control operation of hydroponic cultivation of heterogeneous plants using the hydroponic cultivator using an optimized artificial intelligence (AI) model.

3. The method as described in claim 1, further comprising:
   the fog computing unit using optimization to control operation of hydroponic cultivation of heterogeneous plants using the hydroponic cultivator using an optimized artificial intelligence (AI) model, selectively using Nutrient Film Technique (NFT) hydroponics, Deep Water Culture (DWC) hydroponics or both NFT and DWC hydroponics in the hydroponic system.

4. The method as described in claim 3, further comprising:
   performing image analysis to implement a deep learning model to provide for heterogeneous plant growth from seedling stages to full grown stages which varies from plant to plant and at different stages of plant growth for sustainable growth and action.

5. The method as described in claim 1, wherein the rendering the sensed data as aggregator output data comprises rendering the sensed data from the plurality of sensors as image data obtained from different plants in the hydroponic cultivator.

6. The method as described in claim 1, comprising:
   rendering the sensed data as aggregator output data as an aggregation of data concerning different plants in the hydroponic cultivator; and
   the rendering the sensed data as aggregator output data comprises rendering the sensed data from the plurality of sensors as image data obtained from different plants in the hydroponic cultivator.

7. The method as described in claim 1, further comprising obtaining data, wherein the obtaining data comprises obtaining data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data.

8. The method as described in claim 1, further comprising:
   using the fog computing unit to provide data processing for data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data;

using the fog computing unit to filter the data pertaining to nutrient quality, temperature, humidity, and light intensity, with redundancy removed; and routing the data pertaining to nutrient quality, temperature, humidity, and light intensity from the fog computing unit over the Internet backbone or "cloud".

9. A hydroponic system, the hydroponic system comprising:

a plurality of sensors in a hydroponic cultivator;

a data communication link configured for communicating data from the plurality of sensors to a data aggregator;

the data aggregator configured for rendering sensed data from the plurality of sensors in a predetermined data format as aggregator output data;

a communication link configured for communicating the aggregator output data to a fog computing unit;

an external communication link configured for allowing the fog computing unit to communicate with outside computing routed over an Internet backbone or "cloud"; and instructions stored in non-volatile media for instructing the fog computing unit to control operation of the hydroponic cultivator based on direct control commands executed through the fog computing unit and data inputs obtained by communications with the outside computing routed over the Internet backbone or "cloud", wherein the rendering the sensed data as aggregator output data comprises rendering the sensed data from the plurality of sensors as an aggregation of data concerning different plants in the hydroponic cultivator.

10. The hydroponic system of claim 9, further comprising:

using the fog computing unit to perform optimization to control operation of hydroponic cultivation of heterogeneous plants using the hydroponic cultivator using an optimized artificial intelligence (AI) model.

11. The hydroponic system of claim 9, further comprising:

using the fog computing unit to perform optimization to control operation of hydroponic cultivation of heterogeneous plants using the hydroponic cultivator by using an optimized artificial intelligence (AI) model, selectively using Nutrient Film Technique (NFT) hydroponics, Deep Water Culture (DWC) hydroponics or both NFT and DWC hydroponics in the hydroponic system.

12. The hydroponic system of claim 11, further comprising:

using the fog computing unit to perform image analysis to implement a deep learning model to provide for heterogeneous plant growth from seedling stages to full grown stages which varies from plant to plant and at different stages of plant growth for sustainable growth and action.

13. The hydroponic system of claim 9, wherein the rendering the sensed data as aggregator output data comprises rendering the sensed data from the plurality of sensors as image data obtained from different plants in the hydroponic cultivator.

14. The hydroponic system of claim 9, wherein the rendering the sensed data comprises rendering the sensed data from the plurality of sensors as aggregator output data as an aggregation of data concerning different plants in the hydroponic cultivator, and wherein the rendering the sensed data comprises rendering image data obtained from different plants in the hydroponic cultivator.

15. The hydroponic system of claim 9, wherein the fog computing unit is configured for providing data processing for data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data.

16. The hydroponic system of claim 9, further comprising:

the fog computing unit configured for providing data processing for data pertaining to nutrient quality, temperature, humidity, and light intensity, wherein the data pertaining to nutrient quality comprises data consisting of at least one of pH, salinity, Total Dissolved Solids (TDS) and Electrical Conductivity (EC) data;

the fog computing unit configured for filtering the data pertaining to nutrient quality, temperature, humidity, and light intensity, with redundancy removed; and the fog computing unit configured for routing the data pertaining to nutrient quality, temperature, humidity, and light intensity over the Internet backbone or "cloud".

17. A hydroponic system, the hydroponic system comprising:

means for providing a plurality of sensors in a hydroponic cultivator;

a data aggregator and a fog computing unit;

means for communicating data from the plurality of sensors to the data aggregator;

means for rendering sensed data from the plurality of sensors in a predetermined data format in the data aggregator as aggregator output data;

means for communicating the aggregator output data to the fog computing unit;

means for using the fog computing unit to communicate with outside computing routed over an Internet backbone or "cloud";

means for using optimization to control operation of hydroponic cultivation of heterogeneous plants using the hydroponic cultivator using an optimized artificial intelligence (AI) model, selectively using Nutrient Film Technique (NFT) hydroponics, Deep Water Culture (DWC) hydroponics or both NFT and DWC hydroponics in the hydroponic system; and means for performing image analysis to implement a deep learning model to provide for heterogeneous plant growth from seedling stages to full grown stages which varies from plant to plant and at different stages of plant growth for sustainable growth and action, wherein the fog computing unit is configured for controlling operation of the hydroponic cultivator based on direct control commands executed through the fog computing unit and data inputs obtained by communications with the outside computing routed over the Internet backbone or "cloud".

* * * * *